United States Patent [19]

Sugiyama et al.

[11] Patent Number: 4,697,460
[45] Date of Patent: * Oct. 6, 1987

[54] DEVICE FOR MEASURING TORQUE OF A ROTARY MECHANISM

[75] Inventors: Jun Sugiyama; Hirofumi Komatsubara; Keiichi Shimaoka; Masaharu Takeuchi; Takashi Takeuchi, all of Aichi, Japan

[73] Assignee: Kabushiki Kaisha Toyota Chuo Kenkyusho, Aichi, Japan

[*] Notice: The portion of the term of this patent subsequent to May 20, 2003 has been disclaimed.

[21] Appl. No.: 768,949

[22] Filed: Aug. 23, 1985

[30] Foreign Application Priority Data

Aug. 30, 1984 [JP] Japan .............................. 59-181676

[51] Int. Cl.$^4$ .......................... G01L 3/10; G01B 7/24
[52] U.S. Cl. ........................... 73/862.36; 73/DIG. 2; 324/209; 324/226; 324/227
[58] Field of Search ............... 324/209, 239, 240-243, 324/225-227; 73/862.36, 862.32, 862.33, 862.34, 779, 862.35, DIG. 2

[56] References Cited

U.S. PATENT DOCUMENTS

| | | | |
|---|---|---|---|
| 2,912,642 | 11/1969 | Dahle | 324/209 |
| 3,427,872 | 2/1969 | Leep et al. | 324/209 X |
| 3,861,206 | 1/1975 | Kawafune et al. | 324/209 |
| 3,866,462 | 2/1975 | Fraudin | 324/209 X |
| 4,135,391 | 1/1979 | Dahle | 73/862.36 |
| 4,191,922 | 3/1980 | Harris et al. | 324/241 X |
| 4,243,939 | 1/1981 | Grossman et al. | 324/242 X |
| 4,589,290 | 5/1986 | Sugiyama et al. | 73/862.36 |

FOREIGN PATENT DOCUMENTS

| | | | |
|---|---|---|---|
| 161631 | 10/1982 | Japan | 324/209 |
| 112257 | 6/1984 | Japan | 324/209 |
| 819010 | 8/1959 | United Kingdom | 324/209 |
| 143587 | 2/1961 | U.S.S.R. | 324/209 |
| 176113 | 10/1965 | U.S.S.R. | 324/209 |
| 322612 | 11/1971 | U.S.S.R. | 324/209 |

Primary Examiner—Reinhard J. Eisenzopf
Assistant Examiner—Warren S. Edmonds
Attorney, Agent, or Firm—Koda and Androlia

[57] ABSTRACT

A torque sensor for electrically detecting torque, such as the torque of an automobile engine, wherein a strain disk is provided in the path of torque transmission and the torque is magnetically detected in terms of the magnetostriction generated in the strain disk. The torque sensor comprises a magnetic rotating disk and a magnetic sensor disposed in the vicinity of and opposed to the strain disk. The magnetic sensor comprises a detection coil and an excitation coil oriented perpendicularly to each other with the excitation coil ordinarily being disposed outside of the detection coil. Supplying alternating current to the excitation coil causes an alternating field to be produced within the strain disk and the configuration of this alternating magnetic field is varied by the anisotropy of the strain caused within the strain disk by the transmitted torque. The variation in the configuration of the alternating magnetic field is non-contactingly detected by the detection coil, which outputs a corresponding electrical signal from which the torque can be determined with high accuracy.

26 Claims, 12 Drawing Figures

ANGLE θ BETWEEN EXCITATION COIL POLES AND FLYWHEEL RADIUS

DEVICE FOR MEASURING TORQUE OF A ROTARY MECHANISM

BACKGROUND OF THE INVENTION

1. Field of the Invention

This invention relates to a torque sensor, more particularly to an improved torque sensor capable of noncontanctingly detecting drive torque variation as magnetostriction.

2. Description of the Prior Art

In various kinds of rotating drive mechanisms there is a need to measure torque simply and accurately since such measurement is exceedingly useful in a diverse range of industrial fields for analyzing drive mechanisms and for obtaining a better understanding of their operating condition.

Rotary drive mechanisms are used as prime movers in virtually every sector of industry, two of the most common types being automobile engines and industrial motors. In analyzing the operating condition of such mechanisms, it is important to accurately determine torque as well as the number of revolutions (rpm). Measurement of torque is particularly important in the case of automobile engines since by measuring the torque at the engine and at the transmission, propeller shaft, differential gear and other points of the power train it is possible to control the ignition timing, the amount of fuel injection, the timing for transmission shift, the gear ratio, etc. As a result of such control, it is possible to improve fuel efficiency, driving characteristics, etc.

Also in the case of industrial motors accurate torque measurement can provide data for optimizing control and diagnosis of rotary drive systems.

Conventionally, this type of torque detection has been carried out using a torque detector that detects the amount of strain arising in the rotating shaft. The torque detector of this type uses a number of strain gages bonded on the rotatry shaft and interconnected to form an electrical bridge.

With this conventional detector, however, it is necessary to machine the rotating shaft and/or its bearing in preparation for mounting of the strain gages and associated devices, e.g. a telemeter or a slip ring for electrical connection to the strain gage, and this has an adverse effect on the rotating shaft. Moreover, as a rotating shaft of this type is strongly affected by the torsional vibration of the overall power train, it is not possible to eliminate the error component introduced by the torsional vibration only by measuring the amount of strain in the rotating shaft, so that it is difficult to measure the torque with good accuracy.

To eliminate such effect of the torsional vibration, there have been developed and put to practical application torque sensors which measure the torque on the basis of the amount of strain at a rotating disk where the amount of such torsional vibration related to the overall power train is relatively small. With a torque sensor of this type, because of the decreased adverse effect of the vibrational torque, it is possible to measure the torque with higher accuracy than is possible when the measurement is based on the amount of strain in a rotating shaft as described above.

On the other hand, however, similarly to the case where the measurement is based on the amount of strain in a rotating shaft, this torque sensor also requires that a number of strain gages be bonded in place (on the rotating disk in this case) and be interconnected to form an electrical bridge. The work of attaching the strain gages is thus troublesome. Also, since it becomes necessary to provide a telemetering system, a slip ring or the like for the electrical connection to the bridge provided on the rotating disk, the measurement system becomes large and complex.

SUMMARY OF THE INVENTION

The object of this invention is to provide a high-precision torque sensor which can be easily installed or removed without adverse effect on the power train.

Generally speaking, the method of measuring torque on the basis of the amount of strain arising in a rotating disk can be said to have the following advantages over the method which basis the measurement on the amount of strain arising in a rotating shaft:

1. As a rotating disk generally has a larger moment of inertia than a rotating shaft, the measurement error owing to minute torque variations is low compared with the large amount of such error inevitably included in a rotating shaft measurement. Torque measurement can therefore be carried out with higher accuracy.
2. As a rotating disk has higher rigidity in the direction of the axis of rotation than a rotating shaft, it is less affected by the overall torsional vibration of the power train than a rotating shaft.
3. A rotating disk has a larger radius than a rotating shaft so that it is possible to increase the angular resolution in measuring the torque variation and thus to carry out the measurement with higher accuracy.
4. When the torque of a rotating shaft is measured using a sensor provided on a bearing of the rotating shaft for measuring the amount of strain, the data obtained by the measurement includes an error component corresponding to the torque loss in the bearing due to friction, and it is therefore impossible to measure the torque accurately. On the other hand, when the torque is measured on the basis of the amount of strain in a rotating disk, the axial torque can be accurately measured free from the effect of the torque loss resulting from friction in the bearing.

As can be seen from the above, the method of measuring torque on the basis of the amount of strain in a rotating disk is superior in a number of ways to the method of carrying out the measurement on the basis of the amount of strain in a rotating shaft. Therefore, the present invention uses the torque measuring method based on the amount of strain in a rotating disk.

For attaining the aforesaid purpose, the torque sensor according to one aspect of the present invention is characterized in comprising a magnetic rotating disk, and a magnetic sensor having an excitation coil and a magnetic flux detection element, the magnetic sensor being disposed as opposed across a prescribed clearance to one surface of the region of the rotating disk in which torque strain is generated, whereby the torque transmitted through the rotating disk in noncontactactingly measured with the magnetic sensor as the magnetostriction of the rotating disk.

Thanks to this structure, it is possible in accordance with the present invention to measure the torque transmitted through the rotating disk as the magnetostriction of the rotating disk, noncontactingly and with high accuracy, merely by disposing a simply constructed magnetic sensor having an excitation coil and a magnetic flux detection element as opposed to the rotating disk across a prescribed clearance. As a result, the torque sensor according to this invention makes it possible to carry out torque measurement without special machining of any part of the power train. Moreover, as the present torque sensor can be installed merely by disposing it as opposed to but separated from the power train, it can be mounted and dismounted with ease.

In accordance with another aspect of the present invention, a first magnetic sensor is disposed as opposed across a prescribed clearance to one surface of the region of the rotating disk in which torque strain is generated and a second magnetic sensor is disposed as opposed across the prescribed clearance to one surface of the same rotating disk within a region of the rotating disk in which torque strain is not generated, the torque transmitted through the rotating disk is noncontactingly obtained as the magnetostriction of the rotating disk by arithmetically processing the output signals from the first and second magnetic sensors.

With the torque sensor according to this arrangement of the present invention it is possible to measure the torque with high accuracy free from the effects of the temperature or the rotational velocity of the rotating disk.

Thus, in accordance with the torque sensor of the present invention, since it is possible to noncontactingly measure the torque as the magnetostriction of the rotating disk using one or more magnetic sensors provided separately from any rotating shaft, rotating disk or other component of the power train, it become possible to mount and dismount the torque sensor with ease and further becomes possible to realize a high detection resolution even with a small magnetic sensor, thus enabling high-accuracy torque measurement.

Moreover, since the side surface of the rotating disk with resepect to which the magnetic sensor or sensors are disposed for measurement of strain in accordance with the present invention is generally flat, it is easy to set the clearance between the sensors and the side surface of the rotating disk.

Further, by reducing the thickness of the rotating disk in the region in which strain is produced, it is possible to increase the amount of strain generated in the strain region, whereby the torque can be measured with higher accuracy.

Also in accordance with the present invention, by forming a magnetostriction layer composed of a soft magnetic material with high magnetostriction on the side surface of the rotating disk in the torque strain region thereof, it is possible to increase the torque detection sensitivity, whereby the torque can be measured with even higher accuracy.

DETAILED DESCRIPTION OF THE INVENTION

Embodiments of the invention will now be described with reference to the drawings.

Embodiment 1

Figure 2:
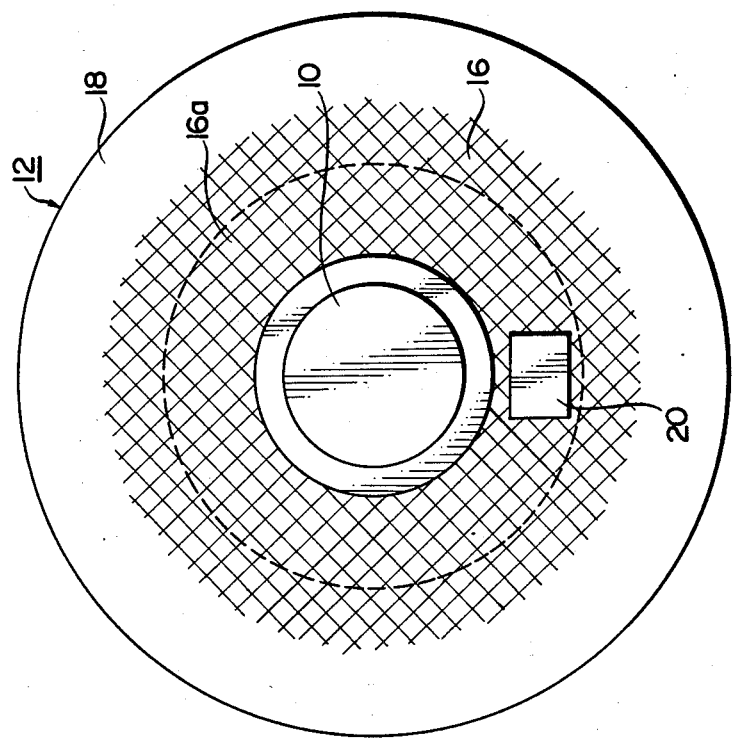
FIG. 2 is a front view of the first embodiment shown in FIG. 1.
Figure 1:
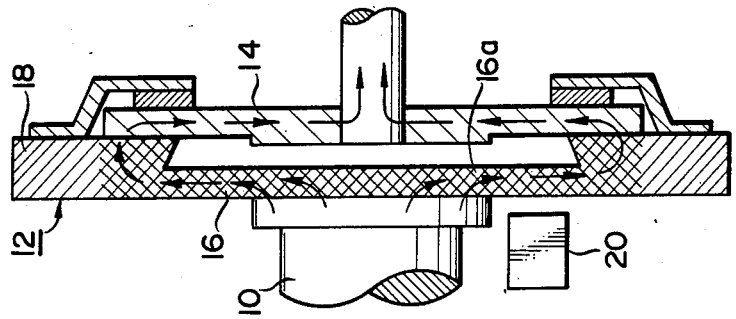
FIG. 1 is an explanatory cross-sectional view showing a first embodiment of the torque sensor according to the present invention.

FIGS. 1 and 2 schematically show the structure of an automobile engine flywheel to which the torque sensor according to this invention is applied. FIG. 1 schematically shows the flywheel in cross section, while FIG. 2 shows a schematic front view of the same.

In accordance with the well-known power train, the torque produced by an automobile engine (not shown) is transmitted to a flywheel 12 (a rotating disk) through a crankshaft 10 and then is transmitted from the flywheel 12 to a transmission (not shown) through frictional contact with a clutch plate 14. In FIG. 1, this path of torque transmission is schematically represented by arrows.

Figure 3:
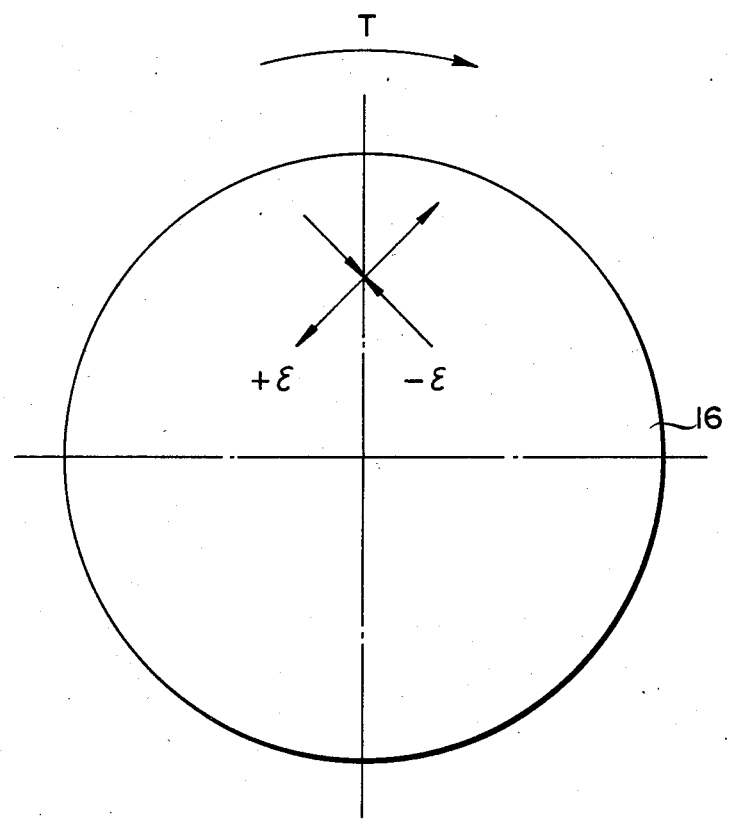
FIG. 3 is a view for explaining the anisotropy of the strain generated within a flywheel.

When torque is transmitted in this manner, the radially inward region of the flywheel 12 where it makes frictional contact with the clutch plate 14 (i.e., the contact region indicated by double hatching in the drawings) is restricted on its one side by the clutch plate 14, while on the other side it receives torque transmitted from the crankshaft 10. As shown in FIG. 3, therefore, this contact region of the flywheel 12 becomes a torque strain region 16 in which, as indicated by the arrows, anisotropy of the strain $\pm \epsilon$ is generated in proportion to the magnitude of the transmitted torque T. On the other hand, the region of the flywheel 12 radially outward from the torque strain region 16 becomes a torque strain free region 18 in which almost no anisotropy of the strain is produced by the transmission of torque.

It can be shown that, within the elastic limit of the flywheel 12, the degree of anisotropy of the strain generated within the torque strain region 16 is proportional to the magnitude of the torque T transmitted to the flywheel 12. Therefore, if the flywheel 12 is made of a ferromagnetic material, it is possible to magnetically detect the degree of anisotropy of the strain generated therein in a noncontacting manner using the magnetostrictive effect, and thus to measure the torque transmitted from the engine.

In measuring the torque in this manner, the degree of accuracy with which the measurement can be carried out increases as the degree of anisotropy, which is produced in the torque strain region 16 by the transmitted torque, increases. Therefore, in this embodiment the flywheel 12 is provided within the torque strain region 16 with a thin region 16a of less thickness than the other portions of the flywheel 12. In this embodiment, the thin region 16a is provided to extend radially outward from the axis of rotation of the flywheel 12 by a predetermined distance.

With this arrangement, the degree of anisotropy of the strain generated in the torque strain region 16 by the transmitted torque will be larger in the thin region 16a than in other regions thereof so that by detecting the anisotropy of the strain generated in the thin region 16a it is possible to measure the transmitted torque with a high degree of sensitivity.

What characterizes this invention is that a magnetic sensor having an excitation coil and a magnetic flux detection element is disposed as opposed across a prescribed clearance to the side surface the torque strain region of a rotating disk and the torque transmitted through the rotating disk is noncontactingly measured with the magnetic sensor as the magnetostriction of the rotating disk.

As shown in FIGS. 1 and 2, in the present embodiment a magnetic sensor 20 is disposed as opposed accros a prescribed clearance to the side surface of the thin region 16a of the torque strain region 16 so as to enable noncontacting measurement of the torque.

Figure 4:
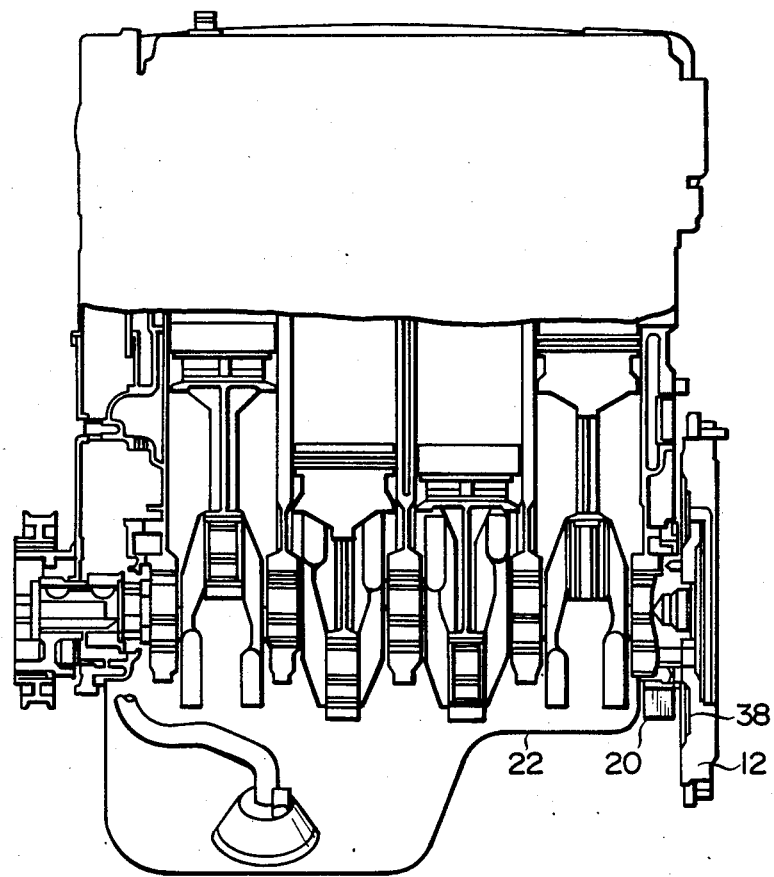
FIG. 4 is an explanatory view indicating the part of the flywheel shown in FIGS. 2 and 3 at which the torque sensor is mounted.

FIG. 4 shows the position at which the flywheel 12 is attached to the engine in the present embodiment. Generally the flywheel 12 of this embodiment is provided behind the final cylinder of the engine in the manner shown in this figure. Therefore, when the measurement of torque is carried out at this position, it is possible to measure the total torque output of the engine.

In this embodiment, the magnetic sensor 20 is mounted near the lower part of the engine oil pan 22 as opposed to the side surface of the flywheel 12 across a clearance of 1.0 mm.

Structure of the magnetic sensor

Figure 5:
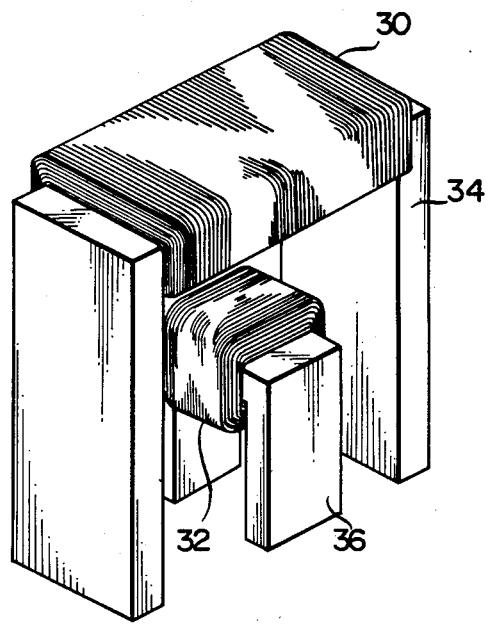
FIG. 5 is an explanatory view of the magnetic sensor used in the present invention.

FIG. 5 shows a specific example of the magnetic sensor 20 used in the present invention. The magnetic sensor 20 has an excitation coil 30 wound on an excitation core 34, and a magnetic flux detection element. In the illustrated example, a detection coil 32 is provided as the magnetic flux detection element. More specifically, the detection coil 32 is wound on a detection core 36 which is disposed within the excitation core 34 so as to lie perpendicular thereto.

For optimum efficiency in magnetically detecting the anisotropy of the strain generated in the flywheel 12 using the magnetic sensor 20, it is preferable that one of the cores 34 and 36 be disposed with its poles aligned parallel with the radial direction of the flywheel 12 and the other core be disposed with its poles aligned perpendicularly to the radial direction of the flywheel 12.

Figure 6:
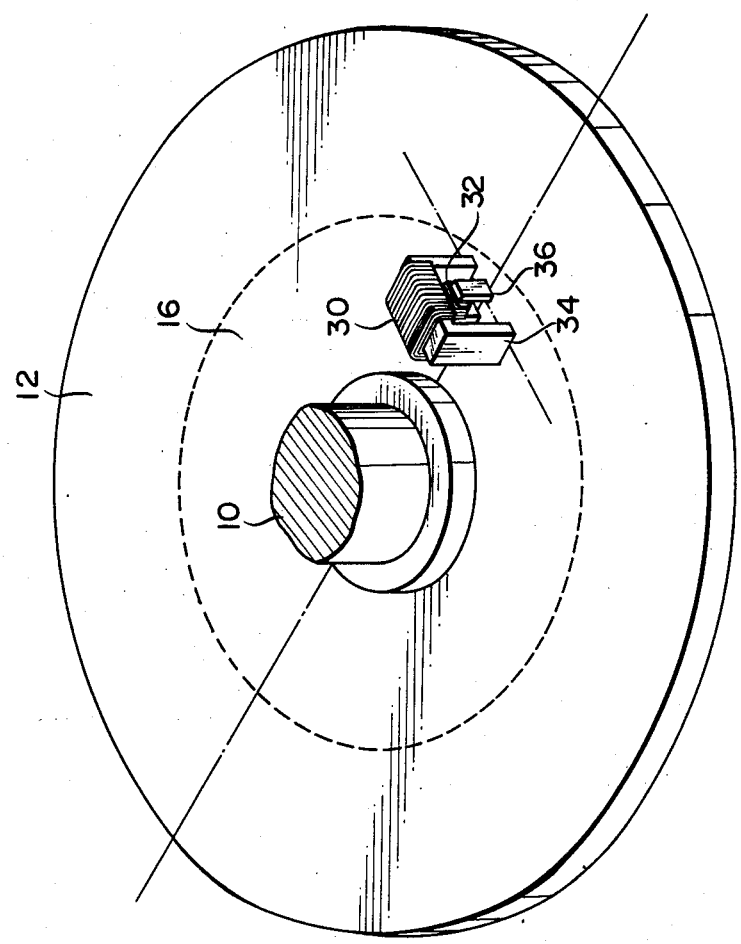
FIG. 6 is an explanatory view showing the position for mounting the magnetic sensor shown in FIG. 5.

Thus as shown in FIG. 6, in the present embodiment of the torque sensor, the excitation core 34 is disposed as opposed to the side surface of the torque strain region 16 across the prescribed clearance in such orientation that its poles lie perpendicular to the radial direction of the flywheel 12, while the detection core 36 is disposed as opposed to the side surface of the torque strain region 16 across the prescribed clearance in such orientation that its poles lie parallel to the radial direction of the flywheel 12.

It should, however, be noted that the same effect can be realized by the reverse arrangement, i.e. with the poles of the excitatation core 34 aligned parallel to the radial direction of the flywheel 12 and the poles of the detection core 36 aligned perpendicular thereto.

In this embodiment, the excitation core 34 is a U-shaped body formed by laminating seventeen 0.35 mm-thick silicon-steel sheets, and when a predetermined alternating current is applied through the excitation coil 30, a predetermined alternating magnetic flux is applied to the torque strain region 16 of the flywheel 12. In order to prevent contact between the flywheel 12 and the excitation core 34, the poles of the excitation core 34 are of course disposed to maintain a predetermined clearance $\delta$ between themselves and the outer surface of the flywheel 12. The excitation coil 30 is formed of 100 turns of 0.3 mm copper wire coated with polyester.

The detection core 36 is a U-shaped body formed by laminating six 0.2 mm sheets of 45% Ni - 55% Fe alloy and is disposed inwardly of and perpendicular to the excitation core 34. Similarly to the excitation core 34, its poles are disposed to maintain the predetermined clearance $\delta$ between themselves and the outer surface of the flywheel 12. The detection coil 32 is formed of 150 turns of 0.13 mm copper wire coated with polyester.

The excitation core 34 and the detection core 36 are fixed in place using an appropriate jig (now shown) for positioning and attachment and the coils 30, 32 are provided with excitation current supply terminals and detection voltage output terminals, respectively.

Figure 7:
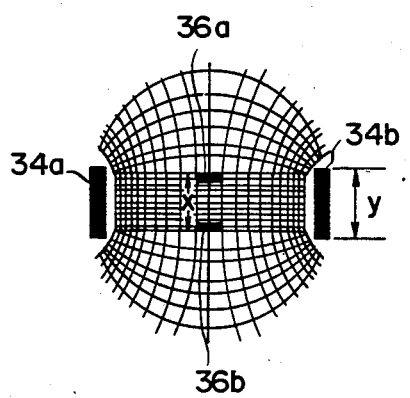
FIG. 7 is an explanatory view showing the configuration of the magnetic field generated by the magnetic sensor.

FIG. 7 shows the configuration of the magnetic field generated in the flywheel 12 by the excitation coil 30 and also shows the positioning of the detection core 36. As can be seen from this figure, the poles 34a, 34b of the excitation core 34 are rectangular in cross section. As a result, it is possible to obtain a uniform and dense magnetic field between the two poles, as shown in FIG. 7. The poles 36a, 36b of the detection core 36 are also rectangular in cross section. In this embodiment, it is preferable for the poles 36a, 36b to be disposed within the uniform magnetic field produced between the poles 34a, 34b and, in fact, they are disposed such that the width X of the gap between them is approximately equal to the width Y of the excitation core 34.

Experiments further show that it becomes possible to carry out signal detection within an extremely dense and uniform magnetic field by making the width X of the gap between the poles of the detection core 36 smaller than the width Y of the excitation core 34, thereby to improve signal detection efficiency.

More specifically, in accordance with the magnetostriction system used in the present invention, the alternating current supplied to the excitation coil 30 causes the alternating magnetic field configuration shown in FIG. 7 to be produced within the flywheel 12. The configuration of this alternating magnetic field is changed by the anisotropy of the strain in the flywheel 12 caused by the transmitted torque and the magnetic flux in the detection core 36, which is located within the changing magnetic field configuration, is detected by the detection coil 32, whereby it is possible to carry out very-high precision torque detection in a noncontacting manner.

Thus in accordance with the present invention, since the torque is measured on the basis of the magnetostrictive effect, the torque measurement can be realized regardless of the direction or rotational velocity of the axis of torque transmission. As a special case, even when the rotational velocity is zero the static torque can be measured, making the torque sensor of the present invention is widely applicable to nearly all types of torque measurement.

Figure 8:
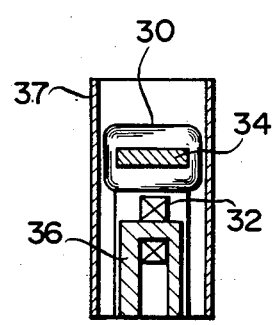
FIG. 8 is an explanatory view showing the detailed structure of the magnetic sensor used in the first embodiment.

In the torque sensor according to this embodiment, the cores 34, 36 are fixed in place using an appropriate positioning jig (not shown), and then the entire sensor is molded within a nonmagnetic case 37 formed of austenite stainless steel (Japanese Industrial Standard SUS 304), as shown in FIG. 8.

When the entire sensor is covered in a nonmagnetic, conductive case 37 in this manner, the magnetic sensor 20 of this embodiment is able to accurately measure torque without being adversely affected by any ambient high-frequency magnetic field fluctuations.

Here it should be noted that although the embodiment described above was explained as using the detecting coil 32 as the magnetic flux detection element, the invention is not limited to this arrangement and it is possible to carry out measurement in a similar manner using other types of magnetic flux detection elements such as a Hall element.

Magnetic sensor mounting angle

Now, defining the angle between the poles 34a, 34b of the excitation core 34 of the magnetic sensor 20 and the radial direction of the flywheel 12 as $\theta$, consideration will be given to the relationship between this angle $\theta$ and the detection sensitivity of the magnetic sensor 20.

Figure 9:
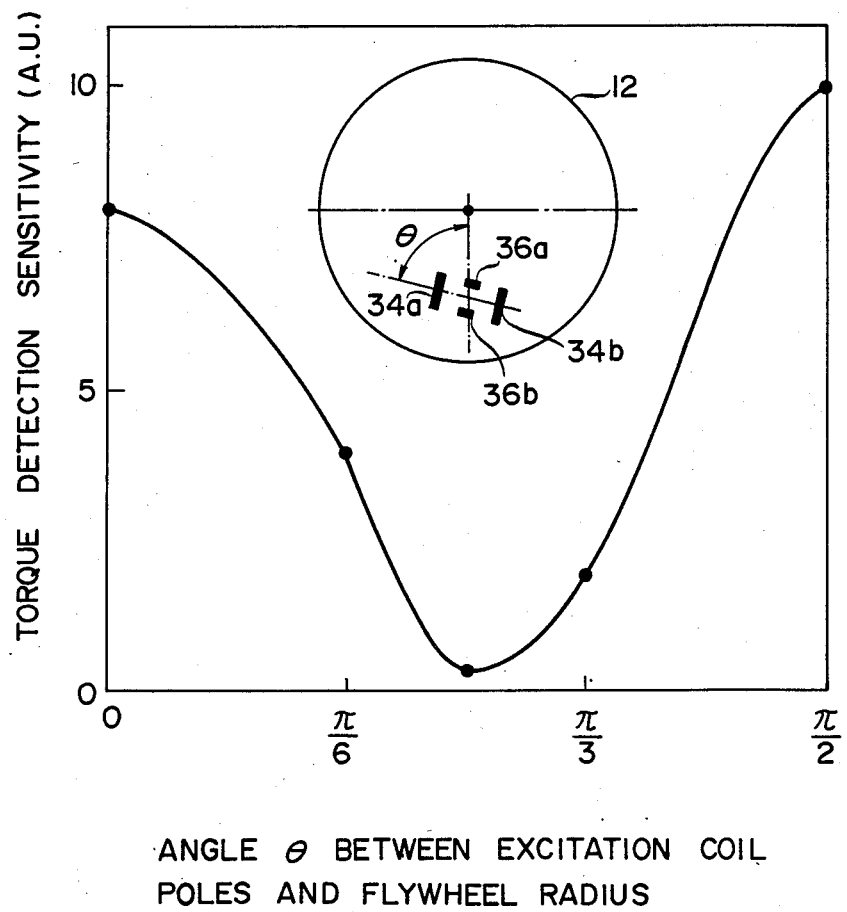
FIG. 9 is a graph including a characteristic curve representing the relationship between torque detection sensitivity and the mounting angle of the magnetic sensor of the first embodiment.

The characteristic curve in FIG. 9 shows the results obtained when the detection sensitivity was measured for various values of the angle $\theta$ at a given fixed clearance between the sensor 20 and the side surface of the flywheel 12.

As is clear from the same figure, the detection sensitivity is maximum at $\theta=0$ and $\theta=\pi/2$ and is minimum at $\theta=\pi/4$.

Although there is no fundamental contradiction between this result and the conclusion obtained through theoretical consideration of the relationship between the anisotropy of the strain arising in the flywheel 12 and the magnetostriction, there is the difference that while theoretically the sensitivity should be the same at $\theta=0$ and $\theta=\pi/2$, the actually measured sensitivity is higer at $\theta=\pi/2$.

As explained in the foregoing, in the present embodiment the angle $\theta$ is selected as $\pi/2$, since this gives the largest torque detection sensitivity. The invention is, however, not limited to this way of disposing the excitation coil 30 and it is also possible to carry out entirely satisfactory torque measurement when $\theta=0$.

Clearance $\delta$ between magnetic sensor and flywheel

The optimum magnitude of the clearance $\delta$ between the magnetic sensor 20 and the flywheel 12 will now be considered.

Figure 10:
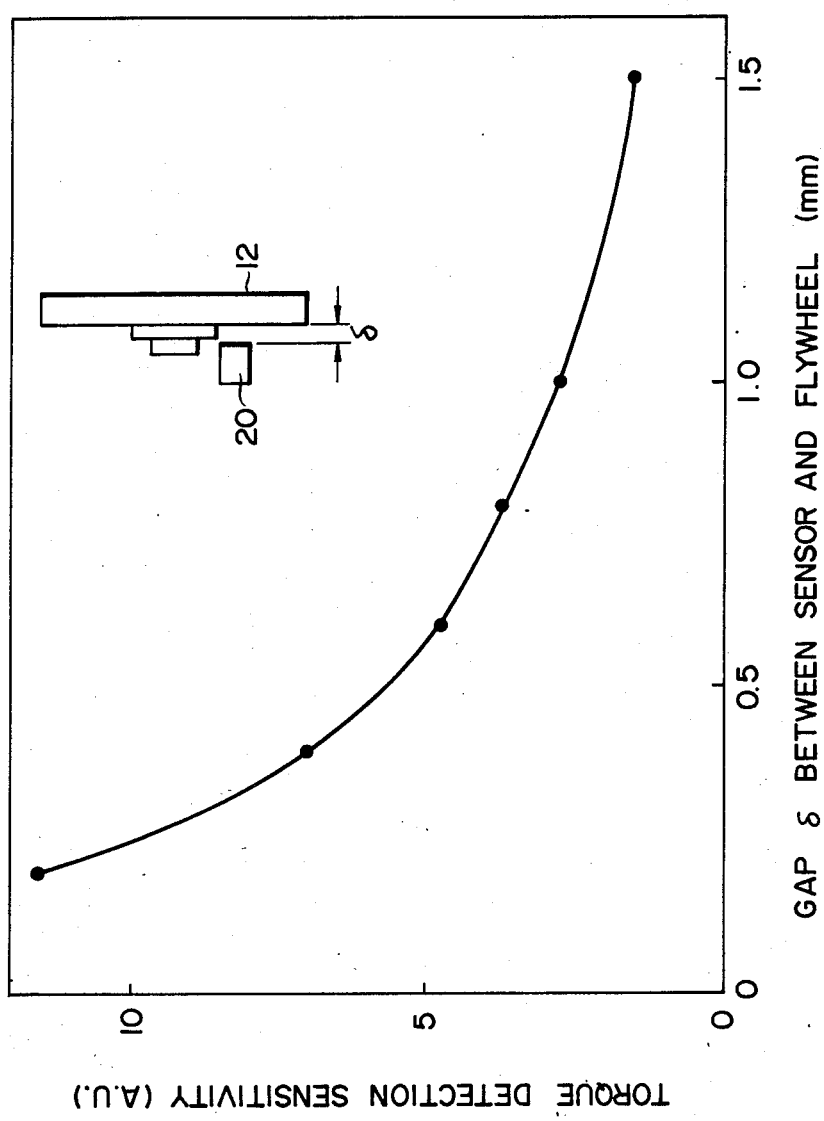
FIG. 10 is graph including a characteristic curve representing the relationship between the torque detection sensitivity and the magnitude $\delta$ of the clearance between the magnetic sensor of the first embodiment and the flywheel.

The characteristic curve in FIG. 10 shows the results obtained when the detection sensitivity was measured for various values of the clearance $\delta$. As will be noted from this curve, the torque detection sensitivity decreases in proportion to approximately the 1.3 power of the clearance $\delta$.

The flywheel 12 of the automobile engine to which the present embodiment is applied varies in its axial position during rotation by $\pm 0.05$ mm so that it is necessary to set the magnitude of the clearance $\delta$ at greater than $\pm 0.05$ mm. Therefore, in the present embodiment, considering both this limitation and the need to obtain as high a detection sensitivity and accuracy as practically possible, the clearance $\delta$ is set at 1.0 mm.

It should be noted, however, that when the rotating disk used for measuring the torque (the flywheel in this embodiment) varies in axial position by less than the amount mentioned above, it is advisable to set the magnitude of the clearance $\delta$ between the magnetic sensor 20 and the side surface of the flywheel 12 at a smaller value in order to increase the torque detection sensitivity.

Material of the rotating disk

Consideration is next given to the magnetic properties of the rotating disk used for torque measurement (the flywheel 12 in this embodiment).

In the manufacture of a rotating disk such as the flywheel 12, consideration is generally given only to the strength of the material used and the magnetic properties of the material are not taken into account.

Therefore, even though the flywheel 12 should be manufactured of a ferromagnetic material, it is likely to have nonuniform magnetic properties and a small constant of magnetostriction.

Figure 11:
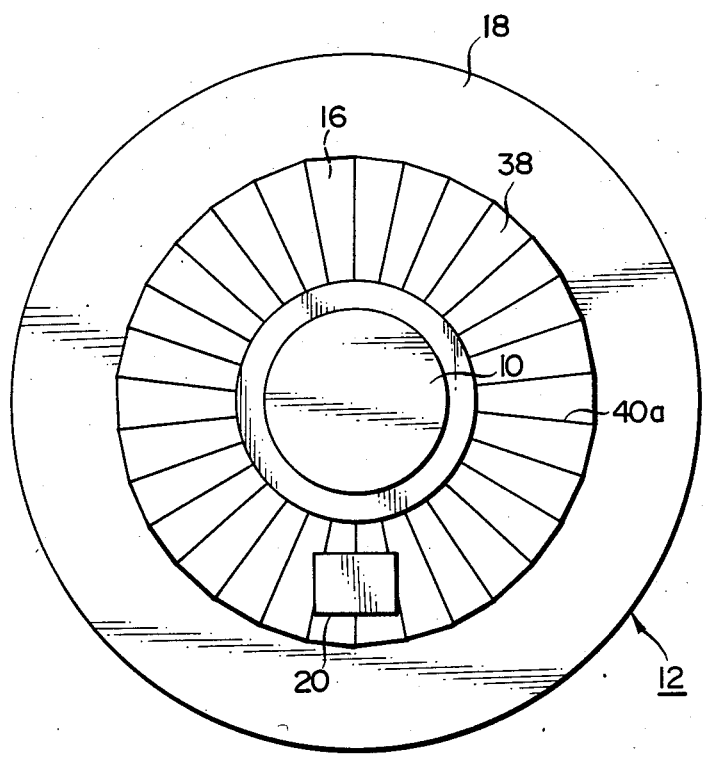
FIG. 11 is an explanatory view showing the structure of a magnetostriction layer provided in the torque-strain region of the flywheel shown in FIGS. 1 and 2.

For this reason, as shown in FIG. 11, the flywheel 12 is the present embodiment is provided at its torque strain region 16 with a magnetostrictive layer 38 formed of a soft magnetic material with high magnetostriction, whereby a uniform magnetic path is formed between the flywheel 12 and each of the cores 34 and 36 of the magnetic sensor 20. This arrangement makes it possible to prevent any reduction in the torque measurement sensitivity of the magnetic sensor 20 which might otherwise occur because of nonuniformity in the magnetic properties of the flywheel 12.

In this embodiment, the magnetostrictive layer 38 is formed by using a high-temperature epoxy bonding agent to attach thirty 40 $\mu$m-thick wedges 40 of amorphous 2605CO ($Fe_{67}Co_{18}B_{14}Si_1$) (a soft magnetic material with high magnetostriction) to the surface of the torque strain region 16 of the flywheel 12 in a doughnut-like pattern around the crankshaft 10.

The reason for using thirty of the wedges 40 is as follows:

First, assume that the flywheel 12 rotates at f revolutions per second. In this embodiment, as the engine makes two power strokes per revolution of the flywheel, the power-stroke frequency is 2f (Hz), meaning that the torque detection signal obtained from the magnetic sensor 20 will also vary at the frequency 2f.

Next, consider the wedges 40 forming the doughnut-shaped magnetostrictive layer 38. As each of the boundaries 40a between adjacent wedges 40 passes in front of the magnetic sensor 20 with the rotation of the flywheel 12, the sensor outputs a characteristic peak signal. The frequency of these peak signals caused by the passage of the boundaries 40a is Nf (Hz), where N is the number of wedges 40 attached to the flywheel. To enable elimination of these peak signals with simple circuitry so as obtain only the torque signals produced by the magnetic sensor 20, it is necessary that the frequency of the peak signals to be eliminated be at least ten times that of the torque signals:

$$Nf \geq 10 \ (2f) \tag{1}$$

By so selecting the value of N, it is possible to eliminate the aforesaid peak signals by simple signal processing. (In the embodiments, $N \geq 20$.)

For the reason stated above, therefore, the number of wedges 40 in the present embodiment is made thirty.

Also, as in the present embodiment the magnetostrictive layer 38 is formed by attaching the wedges 40 in a doughnut-like pattern, it can be fabricated and attached more easily than if it were formed as a unitary doughnut-shaped body and, further, its attachment to the side surface of the flywheel 12 can be carried out with high uniformity with minimum introduction of unwanted strain.

While the present embodiment has been explained in conjunction with an application of the torque sensor to the flywheel 12 of an automobile engine, in which case two variations in torque occur per revolution of the flywheel, it should be noted that when the torque sensor is applied for example to the flywheel of an electric motor, which of course has nothing corresponding to the power stroke of an engine, the variation in torque in this case being small, it is possible to carry out satisfactory torque measurement even when the condition regarding the number of wedges attached is made $N \geq 10$.

Also, although in the embodiment just described the magnetostrictive layer 38 is formed of amorphous 2605CO, the present invention is not limited to the use of this material. It is also possible to use a material with any other composition insofar as it is a "soft magnetic material with high magnetostriction." Such other materials include, for instance, amorphous metals with compositions differing from that described above as well as ordinary non-amorphous (crystalline) ferromagnetic materials, Ni, 50Ni–50Fe, 13Al–Fe being one example.

It is further noted that the invention is not limited to the attachment of the magnetostrictive layer 38 to the flywheel 12 by use of a bonding agent and it is alternatively possible to form the magnetostrictive layer 38 by sputtering or vacuum deposition.

Embodiment 2

Figure 12:
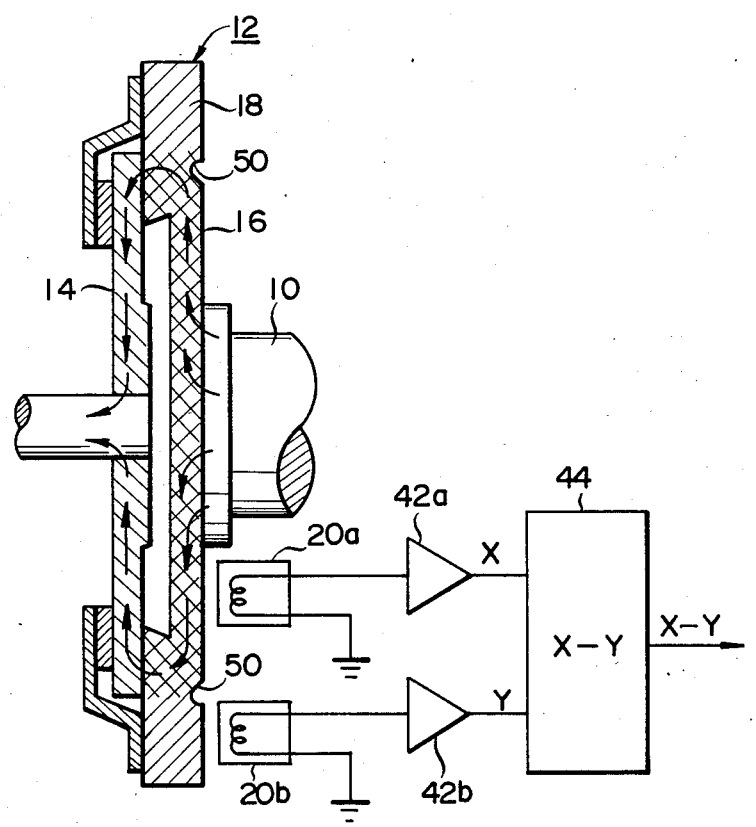
FIG. 12 is an explanatory view showing a second embodiment of the torque sensor in accordance with the present invention.

FIG. 12 shows a second embodiment of the present invention. As will be noted from the arrows in this figure, torque is transmitted from the crankshaft 10 to the flywheel 12 and then to a transmission (not shown) through the clutch plate 14.

Although the strain arising within the flywheel 12 because of the transmission of torque in this manner is concentrated almost entirely in the torque strain region 16, temperature- and rpm-related effects are produced throughout all regions of the flywheel 12.

In accordance with another aspect of the toque sensor according to the present invention the fluctuation in torque transmitted through the rotating disk (the flywheel 12 in this embodiment) is noncontactingly detected on the basis of the strain generated within the flywheel 12 free from any adverse effects related to temperature and rpm.

In order to realize this aspect of the invention, a first magnetic sensor 20a is disposed as opposed across a prescribed clearance to the side surface of the torque strain region 16 of the flywheel 12 and a second magnetic sensor 20b is disposed as opposed across the prescribed clearance to the side surface of the torque strain free region 18 of the flywheel 12.

The first and second magnetic sensors 20a and 20b in this embodiment are of the same structure as that of the magnetic sensor 20 explained in connection with the first embodiment and are, moreover, mounted with respect to the flywheel 12 at the same clearance $\delta$ and mounting angle $\theta$ as in the case of the first embodiment.

The first and second magnetic sensors are respectively connected to amplifiers 42a, 42b, through which they output detection signals X and Y, both of which are input to a subtractor 44 which outputs a signal representing X–Y.

The effects of temperature and rpm on the flywheel 12 are approximately the same in the torque strain region 16 and the torque strain free region 18. This means that the signal X output by the first magnetic sensor 20a includes not only a signal component based on the magnetostriction produced by the transmitted torque but also an error signal component of the magnetostriction resulting from the effects of ambient temperature and rpm. On the other hand, as no magnetostriction related to the transmitted torque is produced in the torque strain free region 18, the signal Y output by the second magnetic sensor 20b is constituted purely of the error signal component of the magnetostriction resulting from the effects of ambient temperature and rpm.

As a result, when as in the torque sensor according to this embodiment, the signal Y output by the second magnetic sensor 20b is subtracted from the signal X output by the first magnetic sensor 20a, it is possible to obtain a signal from which the error component caused by the effects of temperature and rpm has been eliminated, i.e., a signal (X–Y) representing only the magnetostriction resulting from the transmission or torque. As a consequence, it is possible to accurately detect the torque free from any adverse effects related to temperature or rpm.

In this embodiment, in order to realize even more accurate torque detection, an annular groove 50 is provided in the flywheel 12 at the boundary between the torque strain region 16 and the torque strain free region 18, whereby the production of torque-related strain in the torque strain free region 18 is further suppressed.

The same effect can also be obtained by providing in place of the groove 50 a plurality of through-holes or blind holes in the flywheel 12 along the same path as that defined by the groove 50.

Although in the embodiments described above, a flywheel was used as an example of the rotating disk employed for torque measurement, the present invention is not limited to such an arrangement but includes within its contemplation any type of torque-transmitting rotating disk such as a gear, pulley or the like.

Again, while the embodiments set out in the foregoing were described regarding an application to the flywheel of an automobile, the present invention is not limited to such an application and can be applied with like effect for torque measurement with respect a rotating disk used in a transport machine, a machine tool or the like.

As is clear from the foregoing explanation, in accordance with the present invention the measurement of transmitted torque can be carried out by means of one or more magnetic sensors which detect the magnetostriction of a rotating disk without contacting the power train. As a consequence, the invention makes it possible to measure transmitted torque with high precision in a manner which does not adversely affect the torque transmission system in any way whatsoever.

Furthermore, by calculating the difference between detection signals from a torque strain region and a torque strain free region of the rotating disk, it is possible in accordance with this invention to accurately measure torque free from the effects of the ambient temperature and the rotational velocity of the power train.

We claim:

1. A device for measuring torque of a rotating disk comprising:
   a magnetic rotating disk having a thinner region though which torque is transmitted, wherein increased strain is generated in said thinner region, and
   a magnetic sensor having an excitation coil and a magnetic flux detection element wherein said magnetic sensor measures magnetostriction of the rotating disk and is disposed opposed to and with a predetermined clearance to one surface of said thinner region of the rotating disk,
   wherein said magnetostriction is generated by anisotropy of the strain and this strain corresponds to the torque transmitted through the rotating disk whereby torque transmitted through the rotating disk is measured as magnetostriction of the rotating disk.

2. A torque sensor according to claim 1, wherein said magnetic flux detection element comprises a detection coil.

3. A torque sensor according to claim 2, wherein said excitation coil has an excitation core, the poles of which are opposed across the prescribed clearance to said one surface of the rotating disk and are oriented to lie perpendicular to the radial direction of the rotating disk, and said detection coil has a detection core, the poles of which are opposed across the prescribed clearance to said one surface of the rotating disk and are oriented to intersect the poles of the excitation core.

4. A torque sensor according to claim 2, wherein said excitation coil has an excitation core, the poles of which are opposed across the prescribed clearance to said one surface of the rotating disk and are oriented to lie parallel to the radial direction of the rotating disk, and said detection coil has a detection core, the poles of which are opposed across the prescribed clearance to said one surface of the rotating disk and are oriented to intersect the poles of the excitation core.

5. A torque sensor according to claim 2, wherein said excitation coil has an excitation core and said detection coil has a detection coil, said excitation and detection cores being encased in and unitarily held in position by a protective case.

6. A torque sensor according to claim 5, wherein said rotating disk is a flywheel of an automobile engine.

7. A torque sensor according to claim 5, wherein said rotating disk is a driving plate of an automobile engine.

8. A torque sensor according to claim 1, wherein a magnetostrictive layer of a soft magnetic material with high magnetostriction is formed on said one surface of said region of the rotating disk in which torque strain is generated.

9. A torque sensor according to claim 8, wherein the magnetic flux detection element comprises a detection coil.

10. A torque sensor according to claim 9, wherein said magnetostrictive layer is formed by one of sputtering and vacuum deposition.

11. A torque sensor according to claim 9, wherein said excitation coil has an excitation core, the poles of which are opposed across the prescribed clearance to said one surface of the rotating disk and are oriented to lie perpendicular to the radial direction of the rotating disk, and said detection coil has a detection core, the poles of which are opposed across the prescribed clearance to said one surface of the rotating disk and are oriented to intersect the poles of the excitation core.

12. A torque sensor according to claim 9, wherein said excitation coil has an excitation core, the poles of which are opposed across the prescribed clearance to said one surface of the rotating disk and are oriented to lie parallel to the radial direction of the rotating disk, and said detection coil has a detection core, the poles of which are opposed across the prescribed clearance to said one surface of the rotating disk and are oriented to intersect the poles of the excitation core.

13. A torque sensor according to claim 9, wherein said excitation coil has an excitation core and said detection coil has a detection coil, said excitation and detection cores being encased in and unitarily held in position by a protective case.

14. A torque sensor according to claim 13, wherein said rotating disk is a flywheel of an automobile engine.

15. A torque sensor according to claim 13, wherein said rotating disk is a driving plate of an automobile engine.

16. A device for measuring torque of a rotating disk comprising:
    a magnetic rotating disk having a thinner region through which torque is transmitted wherein increased strain is generated in said thinner region,
    a first magnetic sensor having an excitation coil and a magnetic flux detection element, said magnetic sensor being disposed across a prescribed clearance and opposed to one surface of the thinner region of the rotating disk in which torque strain is generated, and
    a second magnetic sensor having an excitation coil and a magnetic flux detection element, said second magnetic sensor being disposed as opposed across the prescribed clearance to one surface of the rotating disk within a region of the rotating disk in which torque strain is not generated, said second magnetic sensor for measuring magnetostriction in said region and for generating an error signal in response to the measurement,
    whereby the torque transmitted through the rotating disk is noncontactingly obtained as the magnetostriction of the rotating disk as measured by the first magnetic sensor after being corrected by said error signal.

17. A torque sensor according to claim 16, wherein said magnetic flux detection elements of said first and second magnetic sensors are detection coils.

18. A torque sensor according to claim 17, wherein a magnetostrictive layer of a soft magnetic material with high magnetostriction is formed on said one surface of said region of the rotating disk in which torque strain is generated.

19. A torque sensor according to claim 18, wherein magnetostrictive layer of a soft magnetic material with high magnetostriction are formed on said one surface of the rotating disk within the region in which torque strain is generated and within the region in which torque strain is not generated.

20. A torque sensor according to claim 17, wherein an annular groove is provided on said one surface of the rotating disk at the boundary between said region in which torque strain is generated and said region in which torque strain is not generated.

21. A torque sensor according to claim 17, wherein said region of the rotating disk in which torque strain is generated is made thinner than the other regions thereof, whereby the amount of magnetostriction in said region is increased.

22. A torque sensor according to claim 17, wherein said excitation coil and said detection coil of said first magnetic sensor are encased in and unitarily held in position by a protective case, and said rotating disk is a flywheel of an automobile engine.

23. A torque sensor according to claim 22, wherein said excitation coil and said detection coil of said second magnetic sensor are encased in and unitarily held in position by a protective case.

24. A torque sensor according to claim 17, wherein said rotating disk is a driving plate of an automobile engine.

25. A torque sensor according to claim 17, wherein said excitation coil and said detection coil of said first magnetic sensor are encased in and unitarily held in position by a protective case, and said rotating disk is a driving plate of an automobile engine.

26. A torque sensor according to claim 24, wherein said excitation coil and said detection coil of said second magnetic sensor are encased in and unitarily held in position by a protective case.

* * * * *